United States Patent
Boland et al.

(10) Patent No.: US 7,573,863 B2
(45) Date of Patent: Aug. 11, 2009

(54) METHOD FOR REAL TIME CONTROL OF TRANSMIT CHAIN FOR SOFTWARE RADIOS

(75) Inventors: Robert P. Boland, Wilmington, MA (US); Peter Simonson, Greenville, NH (US); Peter O. Luthi, Nashua, NH (US); Matthew J. Thiele, Hampstead, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1188 days.

(21) Appl. No.: 10/225,701

(22) Filed: Aug. 22, 2002

(65) Prior Publication Data

US 2004/0037282 A1 Feb. 26, 2004

(51) Int. Cl.
*H04J 3/06* (2006.01)
(52) U.S. Cl. ..................... 370/350; 370/509
(58) Field of Classification Search ............. 370/350, 370/509
See application file for complete search history.

(56) References Cited

U.S. PATENT DOCUMENTS

| | | | |
|---|---|---|---|
| 5,940,438 A * | 8/1999 | Poon et al. ............. 375/222 |
| 6,272,132 B1 | 8/2001 | Ofek et al. | |
| 6,292,484 B1 | 9/2001 | Oliver | |
| 6,563,460 B2 * | 5/2003 | Stilp et al. ............. 342/457 |
| 6,763,057 B1 * | 7/2004 | Fullerton et al. ........ 375/141 |
| 2002/0003799 A1 | 1/2002 | Tomita | |
| 2003/0112753 A1 | 6/2003 | Jo et al. | |
| 2004/0136393 A1 * | 7/2004 | Riveiro Insua et al. ...... 370/432 |

OTHER PUBLICATIONS

PCT International Search Report dated Apr. 22, 2004 of International Application No. PCT/US03/32935 filed Oct. 15, 2003.

* cited by examiner

*Primary Examiner*—Jason E Mattis
(74) *Attorney, Agent, or Firm*—Robert K. Tendler

(57) ABSTRACT

In a communications or jamming system, accurate timing for the control of the frequency, amplitude, modulation type, pulse repetition rate or other transmit characteristics is achieved for the transmission of digitally processed packetized signals through the use of standard non-realtime off-the-shelf components for the digital processing and a realtime interface which reads transmit chain headers and, with the assistance of a precise time reference, assures that the transmit chain is configured in time to transmit the packets. Note that the realtime interface assures nanosecond timing accuracy regardless of timing errors introduced by the off-the-shelf components used in upstream digital processing.

7 Claims, 2 Drawing Sheets

METHOD FOR REAL TIME CONTROL OF TRANSMIT CHAIN FOR SOFTWARE RADIOS

FIELD OF INVENTION

This invention relates to communications systems and more particularly to a method and apparatus for accurately controlling the transmit chain so as to be realtime synchronized with the transmission of packetized data.

BACKGROUND OF THE INVENTION

For communications and jamming systems which use digital processors to packetize data and to process or reconstruct the information to be transmitted at a precise instant of time, not only must stored packets of data be transmitted at exactly the right start time, it is oftentimes necessary to change the characteristics of the transmitter to support a particular application.

For instance, in certain types of communications systems, the frequency of the transmitter is frequency-hopped instant by instant so as to provide for covert operations as well as to provide for spread spectrum operation. In other types of communications systems such as code division multiple access, CDMA, systems, these systems are operated so that signals are transmitted simultaneously on the same frequency and are coded such that they can be disambiguated or retrieved regardless of the fact that they are transmitted at the same time and on the same frequency. Oftentimes, the CDMA systems require that the frequency at which the data is transmitted be momentarily shifted when, for instance, the CDMA system cannot effectively operate to separate out the signals on the same frequency. Under these circumstances, it is sometimes required to change the frequency of the transmission on the fly. This requires precise control of the frequency of the transmitter which must be done on a realtime basis, meaning to nanosecond accuracies.

Frequency hopping is also used for radars in which the output frequency must be rapidly changed in synchrony with the pulses. Also, pulse repetition rates, and modulation type of the particular transmissions are altered on the fly for various purposes. Thus, there is a whole class of frequency agile radars which are used for a wide variety of purposes, as well as radars whose transmit characteristics in terms of modulation type and pulse repetition frequencies need to be varied at will. When the transmission of these radars involves the transmission of packetized data, it is important to be able to synchronize the frequency shifts or changes in modulation type and/or amplitude to occur in synchronization with a precisely timed transmission of the packet.

There is also an application for the use of precision timed transmission of packets in the field of jamming in which multi-purpose jammers must be able to multiplex between various frequencies, modulation types, amplitudes and other factors so as to be able to be effective against a large variety of targets.

Key to any of the above communications, radar and jamming systems is the ability to synchronize the transmission of packetized data with how the packet itself is to be transmitted.

When it is possible to transmit packetized data a precise moment of time controlled to the nanosecond, it is likewise important to be able to reconfigure the transmit chain so as to be able to transmit the packetized data with the appropriate frequency, amplitude or modulation type.

In a co-pending U.S. Patent application entitled, Method for Realtime Digital Processing of Communication Signals by Robert Boland, assigned to the Assignee hereof and incorporated herein by reference, a system is described for using standard off-the-shelf components for the creation of the digitally processed signals used for so-called software radios.

In this patent application, a system is described to eliminate the need for high-cost, difficult to develop, specific digital hardware and realtime synchronizer software for the digital processing by substituting general purpose digital processors which operate in non-realtime, usually having clock accuracies in the millisecond range.

In order to be able to precisely time the output of packetized data which is stored in a buffer, these systems are provided with a precision timed output gate that is controlled by a precision time reference. The precision timing is provided by the gate and reference which constitute a realtime interface that is coupled to a buffer to buffer the output from the standard digital processor.

The digital processor performs two functions. First, it processes and packetizes the data to be transmitted and then it provides the packet with a time header that specifies the exact time at which the packet is to be transmitted. The use of the realtime interface permits the use of standard off-the-shelf processors without having to pay particular attention to precision synchronization and timing, with the interface providing the precision timing necessary to transmit the packetized data at a particular instant in time.

Prior to the invention described in the co-pending application, in order to provide for the realtime accuracy, the entire radio and all of its components were required to have precise timing standards and specialized hardware or software components which assured that for each of the components in the entire communication chain all signals were synced together with the required accuracy.

This required the costly development of extremely specialized digital hardware and realtime synchronizing software to be able to synchronize all parts of the communication chain to establish the exact point in time that the particular packet is transmitted.

Part of the communication chain also involves the transmit chain which includes a transmitter and antenna, with the transmitter also being able to alter the amplitude and frequency of its transmissions as well as having a modulator whose type can be changed on the fly.

As in the case with the exact timing of the transmission of the packets, the changing of the transmit chain by changing the frequency, amplitude and modulation type of the transmitter also had to be performed in precise synchronization with the transmission of the particular packet. As with the precise timing of the transmission of the packet, the timing of the change over of the transmission chain also had to be accomplished in realtime with accuracies commensurate with the accuracy at which the packet was to be transmitted.

Again, as with the exact timing of the transmission of the packet, the control of the transmit chain was inextricably dependent upon the development of precise time references for all components in the system and therefore required the development of specific digital hardware and the ability to control the change over in the transmit chain in realtime.

Note for the purposes of the present invention, realtime means higher accuracy than that available from standard off-the-shelf products, for instance, nanosecond accuracy.

Whether generating the packet and transmitting it at an extremely precise time, or whether reconfiguring the transmit chain to transmit the packet at the required frequency, amplitude or modulation type, the use of standard off-the-shelf components was precluded because timing accuracy was insufficient.

SUMMARY OF THE INVENTION

In order to make sure that the transmit chain is synchronized with the extremely precisely timed transmission of the packets, and is therefore appropriately configured to be ready to transmit the packets at a precise moment, in the subject invention, packetized data developed by a general purpose processor not only contains a timing header to indicate the precise moment in time at which the packet is to be transmitted, the packet also includes headers indicating the frequency, amplitude and modulation type of the transmission required. In order to assure that the transmit chain which includes a transmitter, modulator and antenna is appropriately configured in time to accommodate the transmission of the packetized data, a realtime interface is provided which uses the same precision time reference used to control the start time of the transmission of the packetized data.

Rather than trying to create a realtime control signal or set of signals for the transmit chain through the use of specialized components, in the subject system the packets stored at a packet storage buffer are read out by reading out transmit chain control headers which specify the transmit chain characteristics required for the particular packet. The read out of these headers is controlled by the precision time reference, with the read out of these headers being coupled to a time synchronization control unit that generates control signals to control the characteristics of the transmitter and any antenna tuner used.

The time synchronization control is configured to respond to the corresponding header to provide control signals that result in the transmitter being reconfigured and the antenna tuner being re-tuned in sufficient time relative to the precise time at which the packet is to be transmitted. This permits transmission of the packet with a newly configured transmitter and antenna tuner.

The time synchronization control takes into account the time necessary for reconfiguring the transmitter or antenna tuner to control the frequency, amplitude and modulation type so that the transmitter and antenna tuner are appropriately reconfigured either immediately before or at exactly the same time as the stored packets are to be gated out by the precision time output gate.

It will be seen that the dominant source of timing errors due to non-realtime processing is removed from the precision time path by virtue of the realtime transmit chain interface which operates in realtime due to the use of a precision time reference.

Thus, the subject realtime interface is interposed between the output of the general-purpose processor and the transmit chain to make sure that the transmit chain is in synchronization with the precise time at which the packets are to be transmitted. All timing error is therefore that which is associated with the precision time reference and the precision time output gate, leaving the remainder of the non-realtime tasks to be performed by the general-purpose processor. In general, the digital processor timing is accurate to milliseconds, whereas the timing for the synchronization control of the transmit chain is at the nanosecond accuracy level.

In order for the realtime transmit chain control signals be realtime in the sense of relating to Greenwich Mean Time, the precision time reference may be itself referenced to Greenwich Mean Time through the use of global positioning satellite time references available through the use of GPS receivers. Thus, overall realtime performance in terms of the timing of the transmission packet as well as controlling the transmit chain can be referenced to Greenwich Mean Time through the use of the global positioning satellite system.

In summary, in a communications or jamming system, accurate timing for the control of the frequency, amplitude, modulation type, pulse repetition rate or other transmit characteristics is achieved for the transmission of digitally processed packetized signals through the use of standard non-realtime off-the-shelf components for the digital processing and a realtime interface which reads transmit chain headers and, with the assistance of a precise time reference, assures that the transmit chain is configured in time to transmit the packets. Note that the realtime interface assures nanosecond timing accuracy regardless of timing errors introduced by the off-the-shelf components used in upstream digital processing. In one embodiment, the signals to be transmitted are digitized and then packetized, with the data to be transmitted, reconstructed using non-realtime digital processing. In order to establish the exact time not only for the transmission of the packets but also for changes in the transmit chain including changes in frequency, amplitude, modulation type, or pulse repetition rate, each packet is given a time stamp in the form of a header along with headers relating to the characteristics that the transmit chain is to have when transmitting the packetized data. Changes in the transmit chain are synchronized to the transmission of the packets through the use of the realtime interface which includes a precise time output gate, the timing of which is controlled by the precision time reference, having nanosecond accuracy in one embodiment. The use of the precision time reference to both output stored data as well as configuring the transmit chain results in the synchronization of the transmission of the packet with the changes in the transmit chain such that at the precise time that a packet is transmitted, the transmit chain is appropriately altered.

BRIEF DESCRIPTION OF THE DRAWINGS

These and other objects of the subject invention will be better understood in connection with the Detailed Description in conjunction with the Drawings of which.

DETAILED DESCRIPTION

Prior to describing the realtime components for the control of the transmit chain, what is now presented is a description of the realtime interface used for gating out a particular packet at a particular instant of time from a packet storage buffer through the use of a precision time output gate coupled to a precision time reference which, in one embodiment, uses a rubidium oscillator clock to provide the nanosecond timing accuracies.

Figure 1:
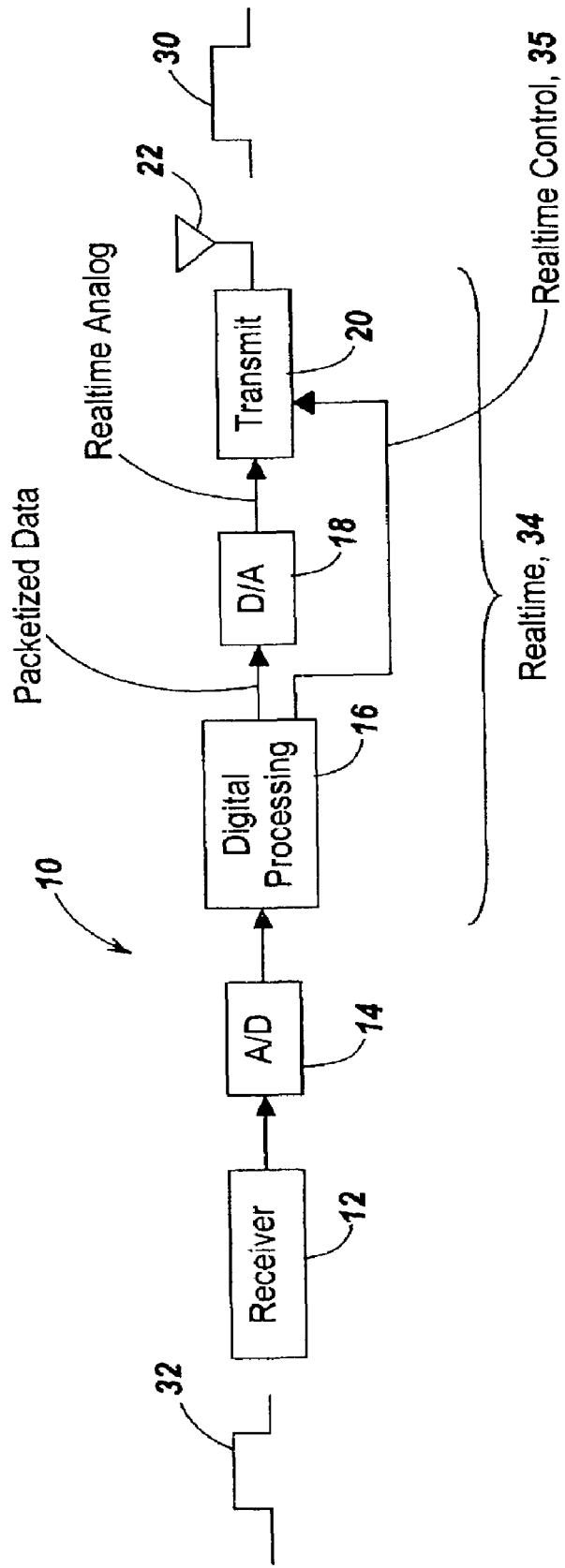
FIG. 1 is a block diagram of a prior art system for providing realtime control of the transmit chain through the use of specialized hardware and software components, each of which must have the precision necessary to provide for realtime transmission of the packets as well as realtime reconfiguring of the transmit chain; and, FIG. 2 is a block diagram of the subject system illustrating the use of a realtime interface, for reading a header relating to transmit chain characteristics and for generating realtime transmit chain control signals without the need for specialized components throughout a software radio.

Referring now to FIG. 1, a communications system is generally designated by reference character 10 to include in one embodiment a receiver 12, an analog-to-digital converter 14, a digital processing unit 16 coupled to a digital-to-analog converter 18 that is, in turn coupled to a transmitter 20. If, as an example, the system is one in which receiver 12 detects an incoming signal to be used for jamming, the system is designed to convert it via an analog-to-digital converter to a digital signal to be used by digital processing unit 16 to alter it for jamming purposes. The altered signal is the reconstructed signal. Thereafter, the digital signal is converted via digital-to-analog converter 18 and is transmitted by transmitter 20 over antenna 22 to, for instance, a perceived threat such as a targeted threat.

It will be appreciated that if it is important that the signal be transmitted by transmitter 20 at a precise instant in time, then all of the elements including the digital processing unit, the digital-to-analog converter and the transmitter must have accurately controlled latencies or delays and must further have a precision clock in order to ensure that the transmission occurs at exactly the instant of time that it should. The result is that there must be real time processing throughout, including the digital processing circuit.

This means that very specialized hardware or real time software components must be introduced into the communications chain so as to ensure the exact time of the output from transmitter 20. Not only must the clock to all of the digital elements be precise, in order to provide exceedingly accurate timing, one must have full knowledge of latency characteristics in any of the elements involved.

As mentioned hereinbefore, this means specialized attention to all of the elements in the communications chain including careful calibration and control to take into account all of the characteristics of the individual elements.

If for instance it is desired to send out a pulse of information having a start time that has a predetermined delay, for instance, from a waveform entering receiver 12, as can be seen by pulse 30, its delay from a pulse 32 which enters the receiver must be controlled through very accurate timing and delay control for the elements between receiver 12 and transmitter 20.

What this means is that regardless of the type of communications chain established, the problem is that there must be realtime processing throughout, meaning that each and every element in the communications chain must have its function totally understood, totally calibrated and totally controlled so that the result of the cascading of the elements is the transmission of a signal at a precise time.

If rather than having a receiver 12, another source of data such as for instance human speech is to be generated, if the speech is then to be processed digitally, this analog data is converted to digital data and processed in the appropriate manner. For time division multiple access communications channels, it will be appreciated that the analog data transmitted must be transmitted in a timeslot which is appropriate. Millisecond timing accuracies associated with standard clocks for digital processors are insufficient to maintain the analog data from one user in his or her particular timeslot.

In order to make certain that this is not the case, a great deal of effort to achieve precise timing synchronization is expended in each and every element of the communications chain so that the information is placed at the appropriate timeslot.

As can be seen, those elements which are critical to the transmission of data at a precise time are those indicated by bracket 34 to be those elements in the illustrated embodiment which are to have carefully controlled and accurate clocks so as to minimize any sources of error. Clearly, the digital processing portion of the communications chain is the most difficult element to control due to the specialized timing processing required.

Figure 2:
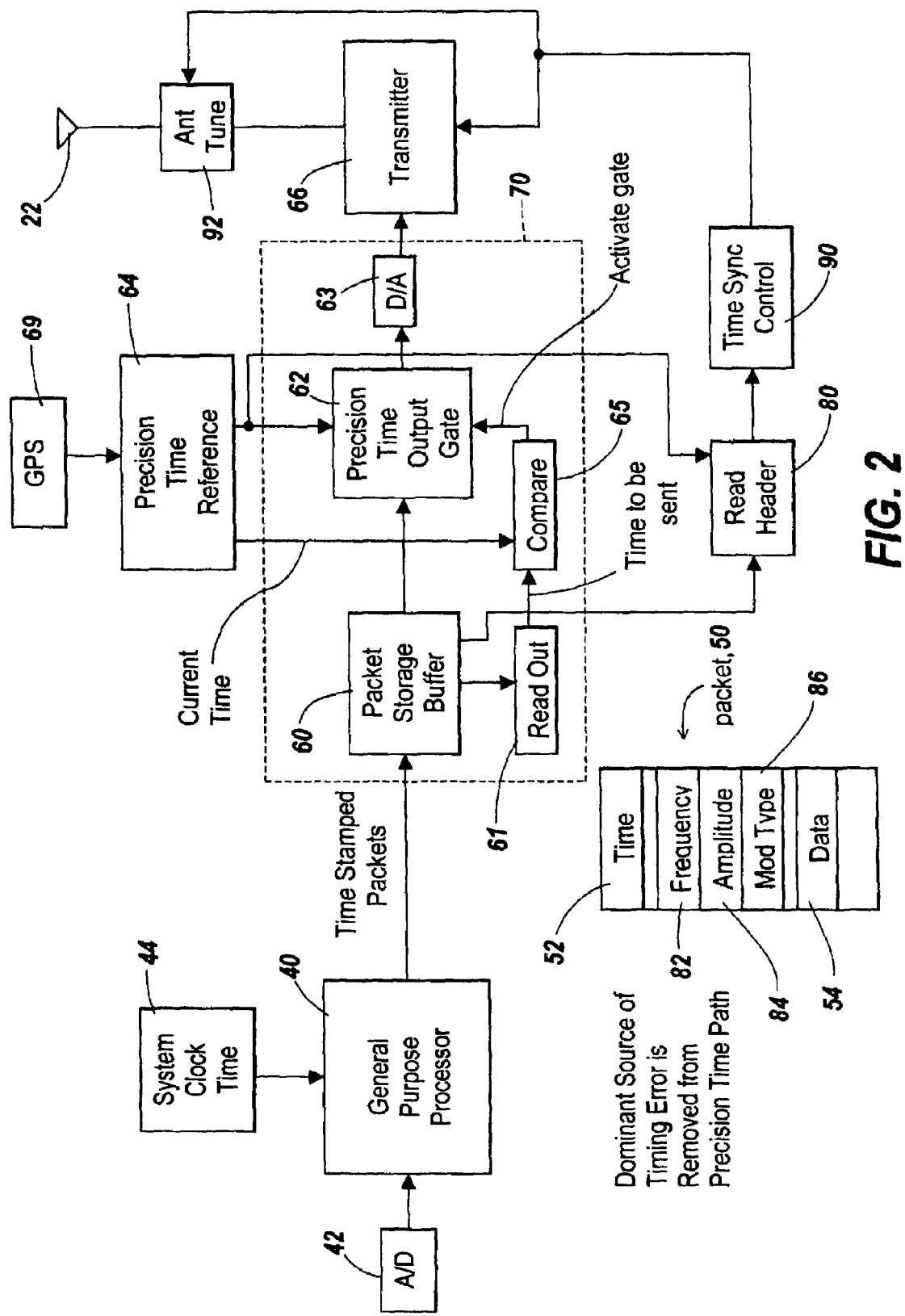

Referring now to FIG. 2, in the subject invention, an off-the-shelf processor 40 is provided rather than the special purpose processor 16 in FIG. 1. Here the information to be transmitted is sampled by analog-to-digital converter 42, with the digital data being processed by processor 40 using a system clock 44 that general need only have millisecond accuracies. The off-the-shelf processor can be any one of a number of garden-variety processors, with the system clock also being available commercially.

Processor 40 generates the data packets to be transmitted and also provides the packets with a time header such that each of the packets is time stamped. Here as can be seen, a packet 50 has a time stamp in header 52, with data 54 existing below header 52.

The time stamp specifies when the data should begin to be transmitted, with the accuracy determined by the accuracy of the time specified by the time stamp.

The result is a number of time stamped packets from processor 40 which are stored at a packet storage buffer 60 until such time as they are read out through a precision time output gate 62 provided with a precision time reference 64.

In one embodiment, the buffer is read out at 61 to establish the time that the packet is supposed to be sent. This is compared at 65 with the current time, and when the two match, the packet is gated out by gate 62 at a rate determined by the precision time reference.

The buffer is thus read out at a precise time by gate 62 whose output is then coupled to a digital-to-analog converter 63 and thence to a transmitter 66.

The precision time reference is accurate in one embodiment to nanoseconds and is provided in one instance through the use of a rubidium oscillator clock. This clock is an off-the-shelf product.

The precision time reference in one embodiment may be slaved to GPS timing signals by coupling a GPS receiver 68 to the precision time reference unit 64, with the precise time then being referenced the time established by the GPS satellites.

It will be appreciated that a dominant source of timing error is associated with processor 40 which is an off-the-shelf product and which is not at all specially configured. The function of processor 40 is to generate data and time stamp the corresponding packets that are then stored and read out at precise times in accordance with the precision time output gate.

As will be seen, the dominant source of timing error associated with the off-the-shelf processor is removed from the precision time path through the use of the buffering and the precision time output gate, with the time delays and latencies associated with the digital-to-analog converter 63 and transmitter 66 being but a small percentage of the overall process. Moreover, time delays through the digital-to-analog converter and transmitter are quite easily controlled, are predictable and are thus taken into account in any calibration process.

One could consider that the precision time output gate along with the packet storage buffer and the digital-to-analog converter constitutes an interface card or device 70, the characteristics of which are controlled by the precision time reference and the characteristics of the precision time output gate.

In short, by using a commercial off-the-shelf processor without having to take into account real time considerations and by removing it as the dominant source of timing error in the precision time path, it is possible to provide a communications system in which only a small fraction of the elements of the system need to have precisely timed components and in which only a small fraction of the components need to be carefully controlled in order to provide the real time output desired.

Realtime Control of the Transmit Chain

Referring back to FIG. 1, in the past, in order to control transmitter characteristics, a realtime control 35 was used to control the transmit chain. Signals on this line were required to have nanosecond-timing accuracies which required specialized hardware and software throughout all the components bracketed by realtime bracket 34. As a result, transmit chain control was as expensive and difficult, as was the realtime gating of the packets themselves.

Referring again to FIG. 2, just as the precision time output gate 62 is controllable through a precision time reference 64, in the subject system, the output of the storage buffer is read out by a unit 80 which reads out frequency header 82, amplitude header 84, and modulation type header 86 at a precise moment in time relative to the precision time output gate. The read out of these various headers provides information which is coupled to a realtime synchronization control unit 90 that takes the information from the headers and provides control signals coupled either to transmitter 66 or to an antenna tuner 92 to reconfigure the transmit chain comprising the transmitter and antenna tuner.

It is the purpose of the realtime synchronization control to reconfigure the transmit chain on the fly so that at the precise time that the particular packet is to be transmitted, the transmitter and its antenna tuner are appropriately configured to provide the required frequency, amplitude and modulation type for the transmission of the particular packet. Unit 90 may be used to pre-set the transmit chain a pre-determined time ahead of the time at which the packet is to be transmitted, thereby to accommodate any latency or delay in the reconfiguration process. It is only important that the transmit chain be reconfigured no later than the precise moment that the packet is to be transmitted. Depending on the application, a certain lead-time may be allotted to reconfigure the transmit chain to allow for any latencies and delays.

By being able to reconfigure the transmit chain in synchronization or time synchrony with the start time of the transmission of the packets, one assures that only a small fraction of the components in the software radio must be precision timed, with the remainder of the digital processing being done in non-realtime through the use of off-the-shelf components. This results in an overall system which is not only less costly and less specialized in terms of design, but also reduces the dominant source of timing error to that which is associated only with the precision timing chain or precision time path, thus to enable transmit chain control to be designated by the output from standard off-the-shelf products.

For purposes of this invention, the transmit chain includes the transmitter, its modulator and the antenna; and the parameters which are reconfigurable include frequency, amplitude, phase, modulation type, antenna tuning, antenna selection and phasing of a phased array for steering or other purposes.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for the precision control of a software radio employing a transmit chain in the transmission of packetized data such that the transmit chain is configured in real time to transmit a realtime analog signal from the packet data, comprising the steps of:

generating packets of data to create realtime analog signals having components characterized by a periodic waveform, the packets having a header including a time stamp indicating when a packet is to be sent, the header describing the characteristics that the transmit chain is to have when transmitting a packet, the transmit chain generating a realtime analog signal having periodic waveform components timed to nanosecond accuracies greater than an accuracy associated with frame length, the transmit chain characteristics taken from the group consisting of frequency, amplitude and modulation type; and, configuring the transmit chain in realtime responsive to the header describing the characteristics that the transmit chain is to have, whereby non-realtime processing can be accomplished by off-the-shelf components having non-realtime accuracies, the accuracy of the timing of the transmit chain being sufficient to generate and transmit the analog signals corresponding to the packet with nanosecond accuracies.

2. The method of claim 1, wherein a packet is transmitted at the precise time corresponding to the associated time stamp thereof, and wherein the configuring step includes configuring the transmit chain sufficiently prior to the precise time that the analog signal is to be transmitted to permit transmission of the analog signal corresponding to the packet at the precise time to permit precision on the fly reconfiguring of the transmit chain.

3. A method for the realtime control of a software radio employing a transmit chain for the transmission of realtime analog signals having components characterized by a periodic waveform generated from packetized data, comprising the steps of:

generating the packets of data with off-the-shelf components having non-realtime accuracies; and, providing realtime control signals having nanosecond accuracies for configuring the transmit chain, the transmit chain and associated transmitted realtime analog signal components characterized by a periodic waveform, the signal components being generated to nanosecond accuracies such that the components of the transmitted signal are generated with accuracies greater than an accuracy associated with frame length, the transmit chain characteristics taken from the group consisting of frequency, amplitude and modulator type, whereby on the fly changes in the transmit chain can be realized without the necessity of providing all realtime components, thus to minimize the cost of controlling the transmit chain, the packets being provided with headers specifying the transmit chain characteristic for the transmission of a packet, and the realtime control signals being generated responsive to the header specifying the transmit chain characteristic for a packet.

4. The method of claim 3, wherein the packets are buffered prior to transmission and wherein the buffered headers are read at a precise time in relation to the time at which the packet is to be transmitted by the transmit chain, thus to establish nanosecond accuracy for the analog signal components.

5. The method of claim 4, wherein the precise time is established by a realtime clock.

6. The method of claim 5, wherein the realtime clock has the nanosecond accuracy.

7. The method of claim 5, wherein the realtime clock includes a GPS receiver for referencing the realtime clock to Greenwich Mean Time.

* * * * *

UNITED STATES PATENT AND TRADEMARK OFFICE
CERTIFICATE OF CORRECTION

PATENT NO. : 7,573,863 B2  Page 1 of 1
APPLICATION NO. : 10/225701
DATED : August 11, 2009
INVENTOR(S) : Boland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1858 days.

Signed and Sealed this

Seventh Day of September, 2010

David J. Kappos
*Director of the United States Patent and Trademark Office*